US006844545B1

(12) United States Patent
Hutchins et al.

(10) Patent No.: US 6,844,545 B1
(45) Date of Patent: Jan. 18, 2005

(54) MALDI PLATE WITH REMOVABLE INSERT

(75) Inventors: Timothy E. Hutchins, Natick, MA (US); Andrew J. Tomlinson, Wayland, MA (US); Philip J. Savickas, Franklin, MA (US)

(73) Assignee: PerSeptive Biosystems, Inc., Framingham, MA (US)

(*) Notice: Subject to any disclaimer, the term of this patent is extended or adjusted under 35 U.S.C. 154(b) by 0 days.

(21) Appl. No.: 10/683,794

(22) Filed: Oct. 10, 2003

(51) Int. Cl.[7] ............................ H01J 49/04; G01N 1/30
(52) U.S. Cl. ..................... 250/288; 250/281; 73/864.91
(58) Field of Search ................................ 250/281, 288, 250/396 R, 398, 400, 492.2; 436/174; 422/99, 104; 73/864.91; 40/707, 710, 712, 724, 755, 766, 790, 791, 797, 799, 777

(56) References Cited

U.S. PATENT DOCUMENTS

| | | | | | |
|---|---|---|---|---|---|
| 433,864 | A | * | 8/1890 | Howard, Jr. | 40/790 |
| 3,009,275 | A | * | 11/1961 | Rosenberg | 40/741 |
| 3,255,544 | A | * | 6/1966 | Bornholt | 40/790 |
| 3,650,306 | A | * | 3/1972 | Lancaster | 141/238 |
| 3,935,656 | A | * | 2/1976 | Pritchard | 40/790 |
| 3,961,920 | A | * | 6/1976 | Gilbert | 96/129 |
| 4,142,726 | A | * | 3/1979 | Anderson | 273/157 R |
| 4,561,200 | A | * | 12/1985 | Hehn | 40/792 |
| 5,109,619 | A | * | 5/1992 | Noggle | 40/737 |
| 5,138,168 | A | * | 8/1992 | Jeavons | 250/385.1 |
| 5,290,513 | A | * | 3/1994 | Berthold et al. | 422/52 |
| 5,434,468 | A | * | 7/1995 | Jeavons | 313/346 R |
| 5,659,990 | A | * | 8/1997 | Henneman et al. | 40/795 |
| 5,869,830 | A | * | 2/1999 | Franzen et al. | 250/287 |
| 5,993,746 | A | * | 11/1999 | Priha et al. | 422/104 |
| 6,255,012 | B1 | * | 7/2001 | Wilson et al. | 429/38 |
| 6,287,872 | B1 | * | 9/2001 | Schurenberg et al. | 436/181 |
| 6,298,593 | B1 | * | 10/2001 | Vilims et al. | 40/768 |
| RE37,485 | E | | 12/2001 | Vestal | |
| 6,722,069 | B1 | * | 4/2004 | Lanier | 40/611.1 |
| 2002/0045270 | A1 | * | 4/2002 | Schurenberg et al. | 436/174 |
| 2002/0148151 | A1 | * | 10/2002 | Whitlow et al. | 40/768 |
| 2003/0057368 | A1 | | 3/2003 | Franzen et al. | |
| 2004/0013576 | A1 | * | 1/2004 | Gfrorer et al. | 422/104 |
| 2004/0084615 | A1 | * | 5/2004 | Schurenberg | 250/288 |

FOREIGN PATENT DOCUMENTS

| | | | |
|---|---|---|---|
| GB | 2378755 | A | 8/2002 |

* cited by examiner

*Primary Examiner*—John R. Lee
*Assistant Examiner*—Bernard E. Souw
(74) *Attorney, Agent, or Firm*—Andrew T. Karnakis

(57) ABSTRACT

A sample plate structure is provided including a retainer plate having a central opening, a sample insert plate which fits into the opening, an optional pressure plate and a handle. The handle applies pressure to the sample insert plate to retain it within the retainer plate. The sample insert plate is provided with a peripheral configuration, which assures that the sample insert plate is properly oriented within the sample plate support structure and is held flat. While the sample insert plate can be a consumable, the remaining portion of the apparatus can be reused.

14 Claims, 2 Drawing Sheets

MALDI PLATE WITH REMOVABLE INSERT

BACKGROUND

The present technology relates to a plate useful in mass spectroscopy such as matrix-assisted laser desorption ionization (MALDI) analysis and more particularly to a MALDI plate having a removable insert for supporting samples to be analyzed.

For the analysis of large molecules such as biomolecules, MALDI mass spectrometry has become a standard method. MALDI mass spectrometry has typically used expensive electrically conductive plates having high flatness tolerances to introduce chemical samples to the mass spectrometer (MS) instrument. This requirement for the plate surfaces to be extremely flat is due primarily to the need for the plate to become an integral part of the mass spectrometer to enhance signal resolution and mass accuracy of measurements made during the MALDI analysis. Current manufacturing practices prohibit making these plates cost effective enough to render them disposable. Therefore, the user is required to utilize laborious cleaning steps accompanied by the exercise of stringent quality control procedures to eliminate sample carryover from one analytical procedure to the next. Additionally, limited space in the ion source and the application of high voltage fields reduce the number of possible technology solutions for producing inexpensive single use plates. Archiving of sample plates containing precious samples for possible re-analysis also necessitates a relatively low cost plate. Furthermore, users are currently unable to cost effectively introduce into the MALDI MS special plate materials or surface chemistry for experimentation. For such experiments, it is common practice to attach trial materials such as membranes or tissue slices on top of current plates for analysis. This practice sometimes causes instrument instability and vacuum problems, and changes instrument optimization, rendering reproducible MS results far more difficult. Accordingly, it would be desirable to provide a sample plate for use in MALDI MS that is sufficiently cost effective to permit its use as a consumable. Such a sample plate would permit a onetime use of the plate thereby eliminating the need to clean the plate and the need for quality control checking of collected data. Having a disposable plate thus ensures no carryover of analyte signals from a previous analysis for which the plate was used, while permitting multiple uses of a sample plate support structure.

SUMMARY

In accordance with the present teachings, a MALDI sample plate structure is provided with a removable insert. The plate structure comprises a retainer plate having an open central portion and a sample insert plate which supports the analyte/matrix mixture and which fits within the central portion. A manually operated handle is provided which functions to exert pressure on the sample insert plate in order to retain the sample insert plate in the retainer plate. An optional pressure plate can be interposed between the handle and the pressure plate. The sample insert plate is configured to retain a plurality of samples and can be archived or discarded following a single use. In various embodiments the insert plate can be coated with hydrophobic materials or uncoated. In various embodiments the insert plate can be disposable, and the retainer plate, optional pressure plate and handle are reused a plurality of times with additional sample insert plates having different surface configurations, if desired.

DESCRIPTION OF VARIOUS EMBODIMENTS

Figure 1:
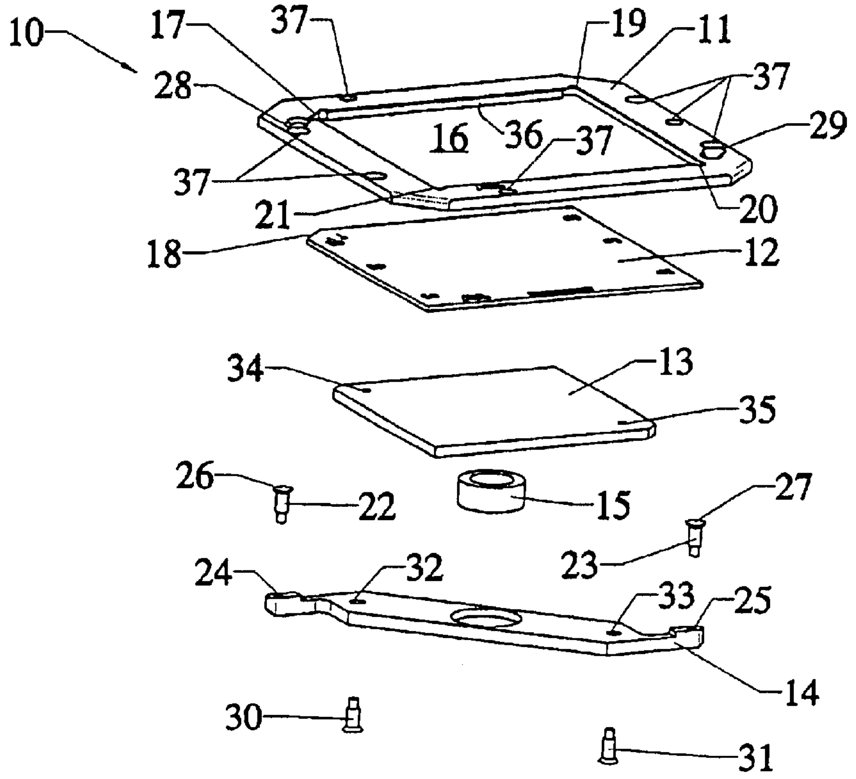
FIG. 1 is an exploded view of one embodiment of this invention.

The present teachings provide a disposable sample insert plate and a reusable sample plate support structure for retaining the insert plate that can be used in MALDI MS analysis. By MALDI MS analysis we mean both mass analysis and tandem mass analysis, the latter often referred to as MS/MS or $MS^n$ analysis. The sample plate is electrically conductive and can be metal such as a metal that can be easily worked in a cost effective manner, as by stamping or the like. Representative suitable metals for forming the sample plate can be stainless steel, aluminum or gold-coated steel and other metal plated substrates such as nickel plated aluminum and the like. Alternatively, the sample insert plate can be formed of an electrically conductive non-metal composition such as silicon, metal-coated or conductive glass or the like.

The sample insert plate is provided with a peripheral configuration that matches the peripheral configuration of the sample support structure. This assures that the insert plate is properly positioned within the sample plate support structure and is held flat. By so-configuring the sample insert plate, assurance is provided that the samples can be analyzed in series while being correctly identified with a source from which the sample is obtained. This, in turn, permits matching of the sample analysis with the source of the sample, such as a particular human patient. The sample plate can also be provided with a particular surface configuration or surface chemistry that serves to properly position and isolate individual samples after depositing a plurality of samples on the sample plate while avoiding mixing of samples. In various embodiments indentations or markings can be created on the insert plate to isolate samples. Alternatively, the sample insert plate can be coated with a hydrophobic material such as paraffin, lipids, waxes, silicon oils or the like that prevent an aqueous sample from migrating from the sample area as described in U.S. patent application Ser. No. 10/277,088, commonly assigned, whose disclosure is incorporated by reference herein. Any other known techniques for isolating samples on a sample plate can be utilized.

In various embodiments the sample plate support structure comprises a retainer plate, an optional pressure plate and a handle. The retainer plate has an open central portion surrounded by a frame that connects to the handle. The periphery of the open central portion can include a ledge upon which the sample plate can rest. The configuration of the sample plate support structure can be formed to accept the sample insert plate in only one orientation so that the sequence of samples being analyzed is always determined, and, if desired, a given sample can be re-analyzed correctly. By this configuration the sample being analyzed always can be matched to the correct source of the sample. The upper surface of the ledge provides a contact surface for the inserted sample plate and is configured to provide a flat and fixed height of the sample insert plate when inserted within the central opening. The frame of the retainer plate can be provided with three sets of holes. One set of holes accepts posts that transmit pressure from the handle either directly to the sample insert plate or indirectly to the sample insert plate through an intermediary pressure plate. A spring also can be provided which is positioned on the handle to exert pressure to the sample insert plate or intermediary pressure plate. A second set of holes can provide for alignment of the retainer plate and sample insert plate within the mass spectrometer via the instruments plate loading mechanism. The third set of holes can be provided to facilitate movement of the sample plate support structure within the instrument plate loading mechanism of the analytical apparatus such as a MALDI apparatus.

In various embodiments the frame of the sample plate support structure includes a ledge around the periphery of the frame that accepts a sample insert plate and the sample insert plate can include a corresponding step around its periphery. In such embodiments the depth of the ledge and the depth of the step on the sample insert plate are matched such that the faces of the sample insert plate and frame of the sample plate support structure are flush with each other. Instrument tuning of this configuration is most similar to that when a standard reusable flat plate is used for sample analysis.

Referring to FIG. 1, the sample plate construction 10 can include a retainer plate 11, a sample insert plate 12, an optional pressure plate 13, a handle 14 and an optional spring 15 such as a wire or wave spring. The retainer plate includes an open central portion 16 having one chamfered corner 17 that is sized and shaped to accept the sample insert plate 12. The sample insert plate 12 also has a chamfered corner 18 which fits into the chamfered corner 17 of the retainer plate 11 while not fitting into corners 19, 20 and 21. This arrangement of corners 17, 19, 20 and 21 assures that sample insert plate 12 is properly positioned to provide the correct sequence of samples being analyzed. A typical number of samples contained on the insert plate 12 is 96, 192 or 384.

Retaining posts 22 and 23 fit into holes 24 and 25 of handle 14. The top portions 26 and 27 of posts 22 and 23 are flanged and fit into holes 28 and 29 of the retainer plate 11. Holes 28 and 29 are generally constructed with two hole portions, a smaller hole intersecting a larger hole in a figure "8"-like shape. The smaller hole portion can be shaped to exactly receive the top flanged portions 26 and 27 so that when the sample construction plate is assembled the top portions 26 and 27 are flush with the top of the retainer plate 11. The posts 22 and 23 can be positioned in the larger hole portion of holes 28 and 29 and then positioned into the smaller hole portion of the holes 28 and 29 by pushing and twisting handle 14. Moving handle 14 from its initial position to its locked position snap fits the top portions 26 and 27 of posts 22 and 23 into the smaller hole portions. When snap-fit into the retainer plate 11, the handle 14 retains the sample insert plate 12 and optional pressure plate 13 in the central portion 16 of the retainer plate 11.

The pressure plate 13 is an intermediate plate for applying additional forces to secure the sample insert plate 12 in the retainer plate 11. When the pressure plate 13 is utilized, posts 30 and 31 extend through holes 32 and 33 of handle 14 and into holes 34 and 35 of pressure plate 13. Spring 15 can provide a means for applying pressure from handle 14 to pressure plate 13 and sample insert plate 12. In various embodiments a ledge 36, which extends about the inner perimeter of the retainer plate 11 provides an improved secure fit of sample insert plate 12 within the retainer plate 11. A series of holes 37 can be provided for transport and registration of the sample plate construction 10 within the mass spectrometer as is known by those of skill in the art.

Figure 2:
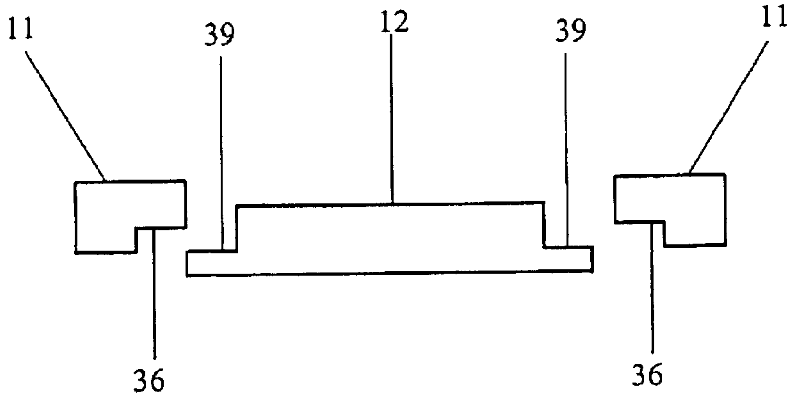
FIG. 2 is an exploded cross-section view of one aspect of the embodiment of FIG. 1.

Referring to FIG. 2, the sample insert plate 12 can be provided in various embodiments with a stepped edge 39 that matches the dimensions of ledge 36 in the retainer plate 11. As the height of the edge 39 and depth of the ledge are precisely matched, the face of the sample insert plate 11 becomes flush with the face of the retainer plate 11 upon final assembly of the sample plate construction 10.

Figure 3:
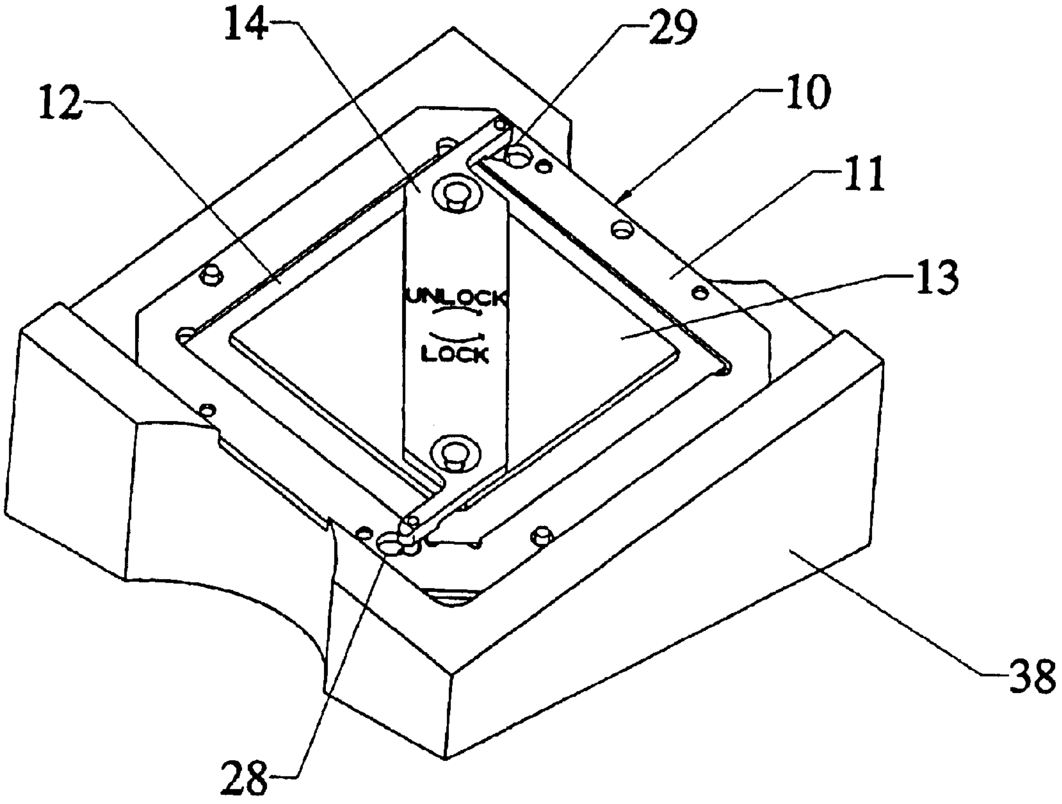
FIG. 3 is a bottom view of the embodiment of FIG. 1 shown with an apparatus used in the assembly of the embodiment.

Referring to FIG. 3, the sample plate construction 10 can be assembled using an optional nest 38. The retainer plate 11 is placed face down in the nest 38 in a single permitted orientation. The sample insert plate 12 is then placed face down in the retainer plate 11 in a manner to match the chamfered feature on both the retainer plate and the insert plate. The top of posts 22 and 23 are located in holes 28 and 29, and the handle 14 is turned to lock the handle 14 and pressure plate 13 to complete the sample plate construction 10. The nest 38 is sloped to the corner of the sample plate construction 10 that contains the chamfer feature on both retainer plate 11 and sample insert plate 12 to aid through the application of gravitational forces registration of the sample insert plate 12 into this "chamfered" corner during assembly of the sample plate construction 10.

The sample insert plate 12 can be provided with a chamfered corner 18 which aligns with chamfered corner 17 of retainer plate 11. The chamfered corners 17 and 18 assure that sample insert plate 12 is properly positioned to provide correct sequence of samples being analyzed as previously discussed. A typical number of sample spots on sample insert plate can be 96, 192 or 384, matching patterns from industry standard sample storage devices.

In various embodiments the sample insert plate 12 uses the orientation feature provided by the chamfered corner 18 to maintain location, orientation and allow registration of discrete spots and sample tracks that are deposited from liquid chromatography-MALDI (LC MALDI) deposition robots as samples to be analyzed in the MALDI instrument.

In various embodiments, the sample insert plate 12 uses this orientation feature provided by the chamfered corner 18 to maintain location, orientation and allow registration of samples other than discrete spots as samples for analysis by MALDI instruments, such as membranes, tissue slices or other technologies used to separate or capture biomolecules for mass spectrometry analysis.

It is to be understood that the sample insert plate can be archived for future analysis, or sample insert plate 12 can be discarded after a single use while the remaining apparatus shown in FIGS. 1 and 2 can be reused.

What is claimed is:

1. A sample support structure that comprises:

a retainer plate having a central opening shaped to accept a sample insert plate, a sample insert plate having a first surface configured to retain a plurality of samples thereon and having a peripheral surface shaped to fit within the central hole in only one orientation, a handle adapted to be attached to the retainer plate in a manner to permit limited rotation of the handle between first and second positions and to be in contact with the surface opposite the first surface of the sample insert plate, wherein the handle is retained on the retainer plate when the handle is rotated to the first position and wherein the handle is removed from the retainer plate when the handle is rotated to the second position to facilitate insertion and removal of the sample insert plate from the retainer plate.

2. The structure of claim 1 further comprising an intermediate plate positioned between the sample insert plate and the handle.

3. The structure of claim 1 including a spring positioned on the handle to apply a bias force to urge the sample plate against the retainer plate.

4. The structure of claim 2 including a spring positioned on the handle to apply a bias force to urge the pressure plate and the sample plate against the retainer plate.

5. The structure of claim 1 wherein the retainer plate includes a ledge along its internal periphery and the sample insert plate includes a stepped edge along its periphery that matches the height of the ledge.

6. The structure of claim 2 wherein the retainer plate includes a ledge along its internal periphery and the sample insert plate includes a stepped edge along its periphery that matches the dimensions of the ledge.

7. The structure of claim 3 wherein the retainer plate includes a ledge along its internal periphery and the sample insert plate includes a stepped edge along its periphery that matches the dimensions of the ledge.

8. The structure of claim 1 wherein the handle includes posts which extend into and are aligned with figure "8"-like holes formed in the retainer plate.

9. The structure of claim 2 wherein the handle includes posts which extend into and are aligned with figure "8"-like holes formed in the retainer plate.

10. The structure of claim 3 wherein the handle includes posts which extend into and are aligned with figure "8"-like holes formed in the retainer plate.

11. The structure of claim 1 wherein an internal periphery of the retainer plate includes a chamfered corner and the sample insert plate includes a matching chamfered corner to provide proper orientation of the sample insert plate within the retainer plate.

12. The structure of claim 2 wherein an internal periphery of the retainer plate includes a chamfered corner and the sample insert plate includes a matching chamfered corner to provide proper orientation of the sample insert plate within the retainer plate.

13. The structure of claim 1 wherein the sample insert plate is a MALDI sample plate for MALDI MS analysis.

14. The structure of claim 2 wherein the sample insert plate is a MALDI sample plate for MALDI MS analysis.

* * * * *